United States Patent [19]

Hansen

[11] Patent Number: 5,622,244

[45] Date of Patent: Apr. 22, 1997

[54] TORQUE CONVERTER CLUTCH HAVING A PARALLEL VISCOUS DRIVE

[75] Inventor: James E. Hansen, Northville, Mich.

[73] Assignee: Ford Motor Company, Dearborn, Mich.

[21] Appl. No.: 537,993

[22] Filed: Oct. 2, 1995

[51] Int. Cl.⁶ .................. F16H 45/02; F16D 47/06
[52] U.S. Cl. .................. 192/3.25; 192/3.29; 192/57; 192/208
[58] Field of Search .................. 192/3.27, 3.25, 192/3.21, 3.29, 3.32, 48.3, 55.4, 57, 58.4, 208, 3.28

[56] References Cited

U.S. PATENT DOCUMENTS

| | | |
|---|---|---|
| 4,317,510 | 3/1982 | Staub, Jr. . |
| 4,473,145 | 9/1984 | Bopp . |
| 4,557,357 | 12/1985 | Tinholt . |
| 4,592,250 | 6/1986 | Plasencia et al. . |
| 4,756,210 | 7/1988 | Franklin et al. . |
| 4,828,082 | 5/1989 | Brand et al. . |
| 5,056,631 | 10/1991 | Macdonald . |
| 5,070,974 | 12/1991 | Kirkwood ............ 192/208 X |
| 5,125,486 | 6/1992 | Murata . |
| 5,209,330 | 5/1993 | Macdonald . |
| 5,213,186 | 5/1993 | Murata . |
| 5,330,038 | 7/1994 | Haka .................. 192/3.29 |
| 5,338,266 | 8/1994 | Guimbretiere . |
| 5,361,880 | 11/1994 | Bojas ................. 192/3.25 |
| 5,386,896 | 2/1995 | Matsuoka . |

*Primary Examiner*—Rodney H. Bonck
*Attorney, Agent, or Firm*—Frank G. McKenzie; James J. Dottavio

[57] ABSTRACT

A bypass clutch for use in an hydrodynamic torque converter (10) includes a viscous coupling (30) driveably engaged with the torque converter input shell (12) and turbine (18), and a friction clutch (24) driveably engaged with said input shell (12) and turbine (18) in parallel to the viscous coupling (30).

15 Claims, 1 Drawing Sheet

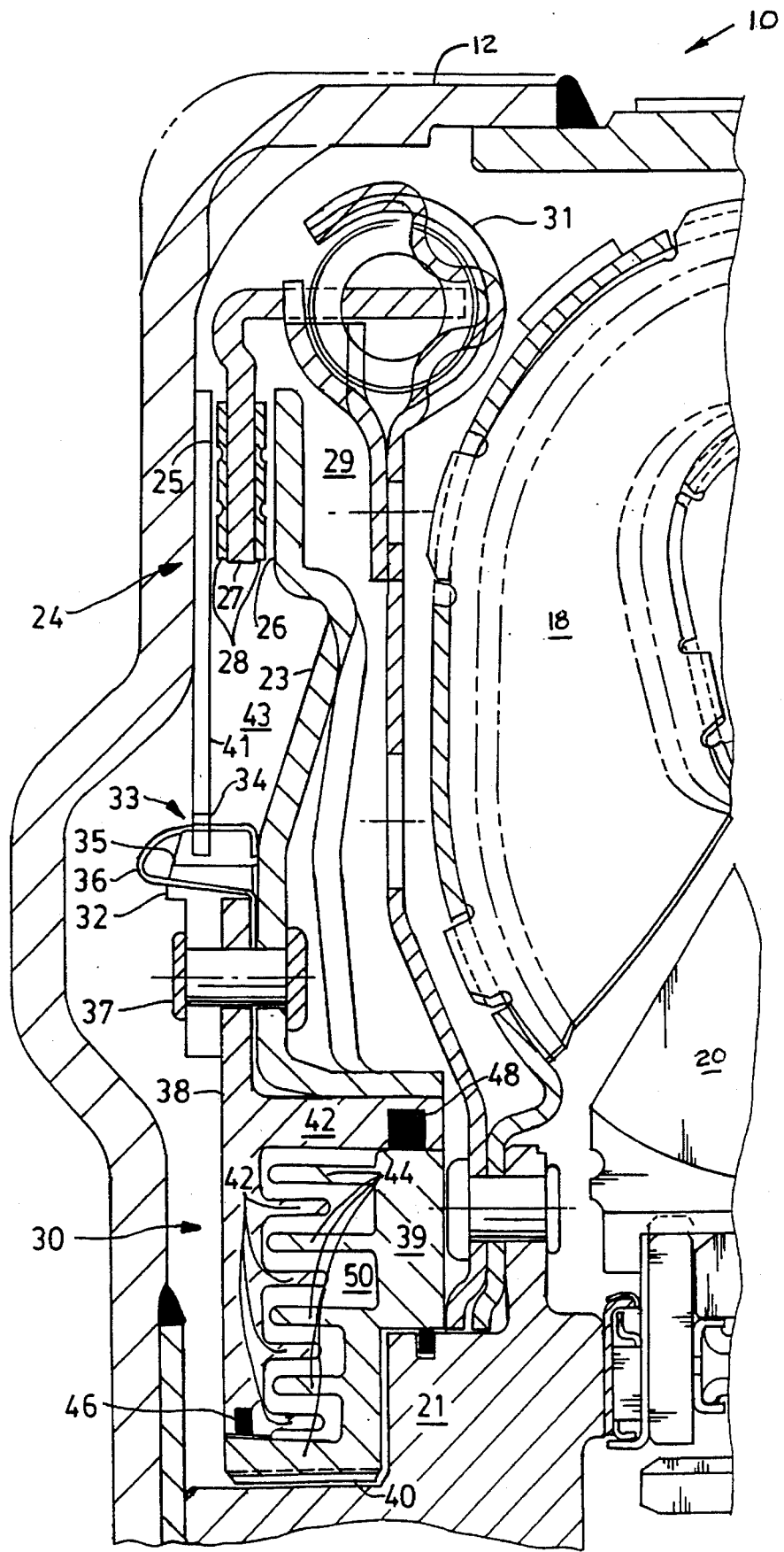

TORQUE CONVERTER CLUTCH HAVING A PARALLEL VISCOUS DRIVE

BACKGROUND OF THE INVENTION

1. Field of the Invention

This invention relates to torque converter drives and more particularly to such drives utilizing a parallel arrangement of a viscous drive and friction clutch to bypass the torque converter fluid drive.

2. Description of the Prior Art

To improve the efficiency of hydrodynamic type transmissions, the use of torque converter bypass devices is increasing. These devices include friction clutch designs, which lock up at higher speeds to improve the efficiency of the transmission at higher speeds where torque multiplication is not required. The friction clutches wear when slipping upon initial engagement. Friction clutches also inherently prevent utilization of the high damping capacity of the torque converter. Therefore, a vibration damper must be utilized with the torque converter clutch in an effort to decrease the transmission of engine torsional vibrations. Other bypass devices include viscous couplings, which provide damping and which reduce the wear concerns of the friction clutch, but the viscous couplings generally are not as efficient because slippage exists with the viscous coupling. Finally, devices have been made, which combine a friction clutch in series with a viscous coupling. In such designs, the viscous coupling acts as a damper to reduce the NVH concerns and reduce the wear of the friction surfaces because the torque from the friction clutch passes through the viscous coupling. However, with such designs the friction clutch must be engaged for the viscous coupling to be effective. Thus the torque path travels through both the friction clutch and the viscous coupling; therefore the shortcomings of each device are present in such a device, as the friction clutch will still wear and the viscous coupling will still slip to some extent. It would therefore be desirable to have a bypass clutch which provides a friction clutch and viscous drive, each of which provide an independent bypass torque path for a torque converter.

SUMMARY OF THE INVENTION

The present invention proposes the utilization of a parallel arrangement of a friction clutch with a continuously slipping viscous drive torque converter clutch, providing independent torque paths to bypass the torque converter fluid drive. The viscous drive unit as proposed may engage at lower speeds, thereby enabling the clutch pressure plate and friction surfaces to rotate at similar speeds before engagement of the friction clutch. This enables the viscous coupling to avoid the vibrations and wear of the prior art clutch designs because the clutch in the present invention acts more as a lockup device for the bypass viscous coupling. Additionally, the lockup feature of the clutch eliminates the slippage concerns of prior art bypass viscous drive designs and thereby improves efficiency in all speed ratios while maintaining the torque multiplication of the torque converter fluid drive.

BRIEF DESCRIPTION OF THE DRAWING

The FIGURE is a partial cross-sectional elevational view of a torque converter and clutch assembly incorporating a parallel viscous drive mechanism according to the present invention.

DESCRIPTION OF THE PREFERRED EMBODIMENT

Referring to the attached FIGURE a torque converter 10 has an input shell 12 adapted to be connected to an internal combustion engine (not shown) as is well known in the art by using welded drive lugs (not shown). The torque converter 10 further includes an impeller (not shown), a turbine 18 and a stator 20. The impeller is welded or otherwise secured to the input shell 12, while the turbine 18 is secured to a torque converter output shaft through a hub 21. The stator 20 is connected in a well-known manner through a conventional one-way drive device to a stationary portion of the transmission. The impeller, turbine 18 and stator 20 are conventional hydrodynamic drive members which provide a fluid drive in a well known manner. As is known with fluid drives, in such a torque converter 10, hydraulic fluid is circulated in the torus formed by the impeller, turbine 18 and stator 20.

A friction clutch assembly 24 is disposed between the input shell 12 and the turbine 18, similar to that described in U.S. Pat. No. 5,209,330 issued May 11, 1993 to Macdonald ('330), assigned to the assignee of the present invention, which is incorporated herein for its relevant teachings. The clutch 24 includes first and second friction surfaces 25, 26, separated by a clutch plate 27 having friction material 28 bonded to both sides of the clutch plate 27 adjacent the friction surfaces 25, 26 by methods well known in the art. The first friction surface 25 is provided on an annular ring 41 secured to the input shell 12. The second friction surface 26 is provided on a piston 23 driveably connected to the input shell 12. The piston 23 and turbine 18 define a first cavity 29 therebetween. The friction clutch provides a drive means between the input shell 12 and hub 21. As the cavity 29 behind the piston 23 is pressurized, the second friction surface 26 is urged into contact with the clutch plate 27. As the clutch plate 27 is contacted by the second pressure plate 26, it is forced into contact with the first pressure plate 25, thereby being driveably engaged with the input shell 12. A direct mechanical torque flow path is thus created through the clutch assembly 24 to the hub 21 to bypass the hydrodynamic drive. In the preferred embodiment, a mechanical spring damper assembly 31 is provided, as is well known in the art to reduce the vibrations created when the clutch 24 is engaged. This spring damper 31 could be eliminated with the present design which uses a viscous coupling 30, but it is preferred to include the damper 31 to further reduce vibrations. In the preferred embodiment, a second cavity 43 is provided between the piston 23 and the shell 12. When the second cavity 43 is pressurized, the piston 23 is urged away from the shell 12, thereby releasing the friction clutch 24. Thus, by balancing pressures between the cavities 29, 43, application of the clutch 24 can be controlled, as described in Macdonald ('330). Alternate clutch designs could be utilized, such as that described in U.S. Pat. No. 5,056,631 issued Oct. 15, 1991 to Macdonald, assigned to the assignee of the present invention, which is incorporated herein for its relevant teachings.

Provided parallel to the clutch assembly 24 in the present invention is a viscous coupling assembly 30. The viscous coupling of the preferred embodiment includes an input drive means from the annular ring 41 to the coupling 30. The drive means is provided by a splined sliding interface 33, comprising a plurality of circumferentially-spaced slots 34 on the inner periphery of the annular ring 41 aligned with a plurality of circumferentially-spaced projections 35 extending axially on the outer periphery of an input plate 32. The splined interface permits relative axial movement of the coupling 30 to the shell 12. Additionally, a spring 36 is provided between the annular ring 41 and the input plate 32 to reduce movement and thus noise and vibrations between the annular ring 41 and the input plate 32 in transient torque conditions.

The input plate 32 and piston 23 are preferably secured to the input flange 38 with a plurality of rivets 37. Alternatively, the input plate 32 and input flange 38 could be secured otherwise, such as by welding or any other means known in the art; or these could be a one-piece integral part; but ease of manufacture and reliability dictate the preferred design. The viscous coupling 30 further comprises an output flange 39 splined 40 to the turbine hub 21.

The input flange 38 has a plurality of input cylindrical members 42 extending axially therefrom. The output flange 39 has a plurality of output cylindrical members 44 interposed between the input cylindrical members 42. Seals 46, 48 are interposed between the first and last pairs of cylindrical members 42, 44 to provide a fluid chamber 50 therebetween. The chamber 50 is filled with a high viscosity silicone fluid. The silicone fluid preferably has a viscosity of between 30,000 to 100,000 centistokes at 25 degrees C. Such fluids are well known and available commercially, such as Dow Corning silicone fluid No. 200. The seals 46, 48 also cooperate to prevent the silicone fluid from escaping into the torque converter fluid which fills the environment surrounding the viscous drive mechanism. Such viscous couplings are well known, an example being Eaton Corp. U.S. Pat. No. 4,473,145, issued Sep. 25, 1984.

As the input shell 12 rotates, the annular ring 41 causes the input plate 32 and input flange 38 to rotate, pressurizing the fluid within the chamber 50. As the pressure increases, the fluid coupling 30 causes the hub 21 speed to approach that of the input shell 12. Thus, when the frictional clutch 24 engages, the clutch plate 27 and friction surfaces 25, 26 are rotating at a speed differential which is less than the differential which is experienced without the viscous coupling 30, as in prior art designs. The lesser differential of the present invention results in less wear, shock, and vibrations during engagement of the friction clutch. When the frictional clutch 24 engages, the drive torque is transmitted through the friction clutch 24, thereby bypassing the viscous coupling 30 and the torque converter viscous drive, eliminating the losses experienced in those viscous devices.

Due to the viscous coupling 30, a speed differential will exist between the input shell 12 and the output shaft when the clutch 24 is not engaged. The amount of speed differential is determined by the pressure in the silicone fluid, the effective surface area of the cylindrical hub members 42 and 44, the clearance between adjacent hub members and the viscosity of the silicone fluid. The rotation of the input flange 38 creates a pumping action which forces the silicone fluid to move rightward, as viewed in the Figure, thereby increasing the pressure between the adjacent surfaces of cylindrical hubs 42 and 44. It will also be appreciated by those skilled in the art, that upon drive reversal, that is during coasting, the pressure in the silicone fluid between adjacent cylindrical hub members will decrease resulting in a smoother backdrive or coast-down condition.

Although the preferred embodiment of the present invention has been disclosed, various changes and modifications may be made without departing from the scope of the invention as set forth in the appended claims.

What is claimed is:

1. A hydrodynamic torque converter having an input shell, a turbine and a bypass clutch, comprising:

a viscous coupling drivably engaged with said input shell and turbine, said coupling comprising an input member in continual driving engagement with said input shell; and a friction clutch drivably engaged with said input shell and turbine, said friction clutch having a parallel driving relationship to said viscous coupling.

2. The bypass clutch of claim 1, wherein said viscous coupling further comprises:

an annular input flange with a plurality of cylindrical input members extending therefrom;

an input drive means for drivably connecting said input flange and input shell;

an annular output flange having a plurality of cylindrical output members extending therefrom and being disposed circumjacent respective cylindrical input members providing an interdigitaled relation therebetween, said output flange being driveably engaged with said turbine; and viscous fluid in communication with said input and output members so that upon relative rotation between said input and output members a pumping action is created to pressurize the fluid therebetween, thereby transmitting rotary drive between said input flange and said output flange.

3. The viscous drive of claim 2, wherein said input drive means comprises:

a driving member carried by said input shell, said driving member having an annular inner surface with a plurality of circumferentially-spaced axial slots in said inner surface; and said input flange further comprises an outer surface having a plurality of circumferentially-spaced, axially-extending projections in continuous meshing engagement with the slots in said driving member.

4. The input flange of claim 3 wherein the axially-extending projections of the input flange are carried on an input plate riveted to the input flange.

5. The bypass clutch of claim 2, wherein said friction clutch further comprises:

a first friction surface carried on said input shell; and a clutch plate having a first end driveably engaged with one of the group consisting of said output flange and said turbine, and a second end having a second friction surface adjacent said first friction surface, said second friction surface being removably engagable with said first friction surface to provide a driving connection therebetween.

6. The bypass clutch of claim 5, wherein said friction clutch further comprises a damping means interposed between the first and second ends of said clutch plate.

7. In an hydrodynamic torque converter using an impeller drivably connected to the torque converter input shell and a turbine located between the input shell and the impeller, a clutch for drivably releasing and locking the impeller and turbine, comprising:

a frictional drive means drivably connecting said input shell and turbine having a first friction surface carried on the input shell, a piston axially slidably mounted on the turbine, said piston sealed on the turbine against passage of fluid, a second friction surface located at a radially outer portion of the piston facing the first friction surface; and a viscous coupling supported by said turbine, said coupling comprising an input member in continual driving engagement with said shell drivably connecting said input shell and turbine in a parallel drive path to said frictional drive means.

8. The torque converter of claim 7, wherein said clutch further comprises:

means for nonreleasably connecting the piston and input shell and for permitting axial displacement of the piston relative to the input shell;

a clutch plate supported on the turbine for axial sliding movement relative to the turbine having a friction disc located between the first friction surface and second friction surface; and passage means for alternatively pressurizing and venting a first space located between the input shell and the piston and a second space located between the piston and the turbine.

9. The clutch of claim 8 wherein the means for connecting the piston and input shell comprises:

an annular ring fixed to the input shell, having a first friction surface located at a radially outer portion and a first spline surface located at a radially inner portion; and an input plate fixed to the piston, having a second spline surface in meshing engagement with the first spline surface.

10. The clutch of claim 9 having a damper means carried on the frictional drive means.

11. The clutch of claim 9 wherein the annular ring is welded to the input shell at a location between the first friction surface and the first spline surface.

12. The clutch of claim 9 wherein a surface provided on one of the group consisting of the annular ring, piston and clutch plate includes friction material bonded to said surface and extending between radially inner and outer portions thereof, said friction material having radially spaced annular groves connected by first radially directed grooves that communicate with the radially inner region of the friction material and second radially directed grooves that communicate with the radially outer region of the friction material.

13. The clutch of claim 9 wherein the viscous coupling comprises:

an annular input flange having a plurality of cylindrical input members extending axially from said input flange, said input flange driveably engaged with said input shell;

an annular output flange having a plurality of cylindrical output members extending axially and being disposed circumjacent respective cylindrical input members providing an interdigitaled relation therebetween, said output flange being supported by said turbine; and a viscous fluid in communication with said input and output members so that upon relative rotation between said input and output members a pumping action is created to pressurize the fluid therebetween and viscously transmit rotary drive from said input flange to said output flange.

14. The clutch of claim 13, wherein the engagement between the input flange and the input shell comprises:

an annular ring driveably supported by said input shell having an annular inner surface with a plurality of circumferentially spaced axial slots in said inner surface; and said input flange further comprises an outer surface having a plurality of circumferentially-spaced, axially-extending projections in continuous meshing engagement with said slots in said annular ring.

15. In an hydrodynamic torque converter using an impeller driveably connected to the torque converter input shell and a turbine located between the input shell and the impeller, a friction clutch and viscous coupling for driveably releasing and locking the impeller and turbine, comprising:

a first friction surface carried on the input shell;

a piston slidably mounted on the turbine, sealed on the turbine against passage of fluid, and having a second friction surface located at a radially outer portion of the piston, facing the first friction surface;

an annular ring fixed to the input shell, having a first friction surface located at a radially outer portion, and a first spline surface located at a radially inner portion;

an input plate fixed to one of the group comprising the piston and turbine, having a second spline surface in meshing engagement with the first spline surface;

a clutch plate supported on the turbine for axial sliding movement relative to the turbine having a friction disc located between the first friction surface and second friction surface;

passage means for alternatively pressurizing and venting a first space located between the input shell and the piston and a second space located between the piston and the turbine;

an annular input flange having a plurality of cylindrical input members extending axially from said input flange, said input flange drive ably engaged with said input plate;

an annular output flange having a plurality of cylindrical output members extending axially and being disposed circumjacent respective cylindrical input members providing an interdigitaled relation therebetween, said output flange being supported by said turbine; and a viscous fluid in communication with said input and output members so that upon relative rotation between said input and output members a pumping action is created to pressurize the fluid therebetween and viscously transmit rotary drive from said input flange to said output flange in a parallel drive path to said friction clutch.

* * * * *